(12) United States Patent
Kozakai

(10) Patent No.: US 9,195,262 B2
(45) Date of Patent: Nov. 24, 2015

(54) INFORMATION PROCESSING APPARATUS AND COMPUTER PROGRAM PRODUCT

(71) Applicant: Yasuyuki Kozakai, Kanagawa-ken (JP)

(72) Inventor: Yasuyuki Kozakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 392 days.

(21) Appl. No.: 13/724,117

(22) Filed: Dec. 21, 2012

(65) Prior Publication Data

US 2013/0254427 A1    Sep. 26, 2013

(30) Foreign Application Priority Data

Mar. 26, 2012  (JP) .................. 2012-070360

(51) Int. Cl.
*H04J 3/14*        (2006.01)
*G06F 1/14*        (2006.01)

(52) U.S. Cl.
CPC .................. *G06F 1/14* (2013.01)

(58) Field of Classification Search
USPC .................. 370/242, 252, 410, 503
See application file for complete search history.

(56) References Cited

U.S. PATENT DOCUMENTS

| 2001/0010059 A1* | 7/2001 | Burman et al. ............... 709/224 |
| 2005/0039172 A1* | 2/2005 | Rees et al. .................... 717/130 |
| 2007/0112948 A1* | 5/2007 | Uhlik ............................. 709/223 |
| 2007/0160173 A1* | 7/2007 | Takeuchi ........................ 375/355 |
| 2008/0212574 A1* | 9/2008 | Andre et al. ................... 370/356 |
| 2009/0109988 A1* | 4/2009 | Musunuri et al. ............. 370/412 |
| 2010/0185781 A1* | 7/2010 | Anderson ...................... 709/248 |
| 2011/0274227 A1* | 11/2011 | Suemitsu et al. ............. 375/362 |
| 2013/0166613 A1* | 6/2013 | Ozaki et al. ................... 707/827 |
| 2014/0068062 A1* | 3/2014 | Nishida ........................ 709/224 |

FOREIGN PATENT DOCUMENTS

JP        07-264766        10/1995

OTHER PUBLICATIONS

Japanese Office Action for Japanese Patent Application No. 2012-070360 mailed on Apr. 15, 2014.

* cited by examiner

*Primary Examiner* — Andrew Lee
(74) *Attorney, Agent, or Firm* — Amin, Turocy & Watson, LLP

(57) ABSTRACT

According to an embodiment, an information processing apparatus includes a selector. The selector is configured to acquire a first time obtained by converting a measurement time of a first piece of measurement data based on a clock of a first time server, a second time obtained by converting the measurement time of the first piece of measurement data based on a clock of a second time server, a third time obtained by converting a measurement time of a second piece of measurement data based on the clock of the first time server, and a fourth time obtained by converting the measurement time of the second piece of measurement data based on the clock of the second time server. The selector is also configured to select a time server with the largest number of combinations of the converted times resulting in no error among pieces of measurement data and time servers.

9 Claims, 11 Drawing Sheets

FIG.3

| APPARATUS ID: XXXX | | | | |
|---|---|---|---|---|
| TIME OF TIME SERVER #1 [ms] | TIME OF TIME SERVER #2 [ms] | TIME OF TIME SERVER #3 [ms] | VOLTAGE | CURRENT |
| 123993.000 | 123002.000 | 122942.000 | 0.000 | 0.000 |
| 123994.389 | 123003.389 | 122943.389 | 77.000 | 2500.000 |
| 123995.778 | 123004.778 | 122944.778 | 133.368 | 4330.127 |
| 123997.167 | 123006.167 | 122946.167 | 154.000 | 5000.000 |
| 123998.556 | 123007.556 | 122947.556 | 133.368 | 4330.127 |
| 123999.944 | 123008.944 | 122948.944 | 77.000 | 2500.000 |
| 124001.333 | 123010.333 | 122950.333 | 0.000 | 0.000 |
| 124002.722 | 123011.722 | 122951.722 | -77.000 | -2500.000 |
| 124004.111 | 123013.111 | 122953.111 | -133.368 | -4330.127 |
| 124005.500 | 123014.500 | 122954.500 | -154.000 | -5000.000 |
| 124006.889 | 123015.889 | 122955.889 | -133.368 | -4330.127 |
| 124008.278 | 123017.278 | 122957.278 | -77.000 | -2500.000 |
| 124009.667 | 123018.667 | 122958.667 | 0.000 | 0.000 |

FIG.4

|  | TIME SERVER #1 | TIME SERVER #2 | TIME SERVER #3 |
|---|---|---|---|
| TIME ERROR | 100.223 | 1091.213 | 1151.123 |
| CLOCK RATIO | 1.0002 | 1.0001 | 0.9999 |
| SYNCHRONIZATION TIME | 123990.000 | 123991.300 | 123990.020 |

| VOLTAGE VALUE | 154 kV |
| --- | --- |
| CURRENT VALUE | 5000 A |
| TIME OF TIME SERVER #1 | 403328.743453700 |
| TIME OF TIME SERVER #2 | N/A |
| TIME OF TIME SERVER #3 | 401327.098856167 |

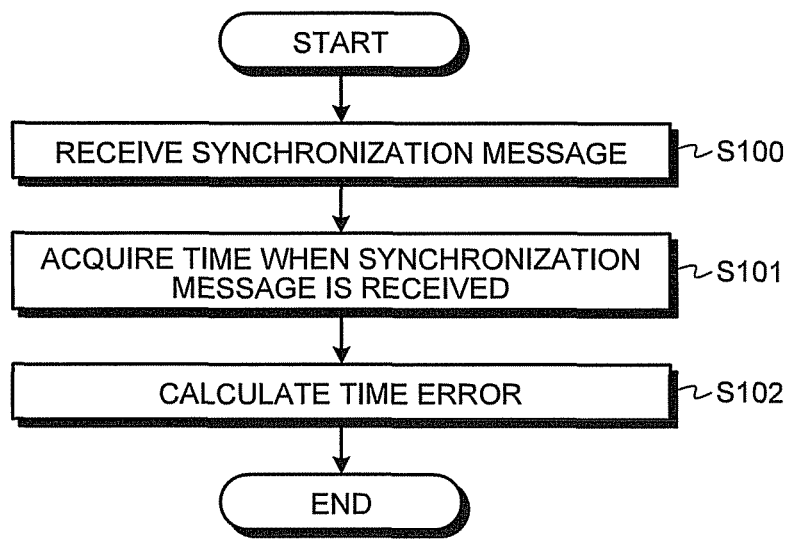
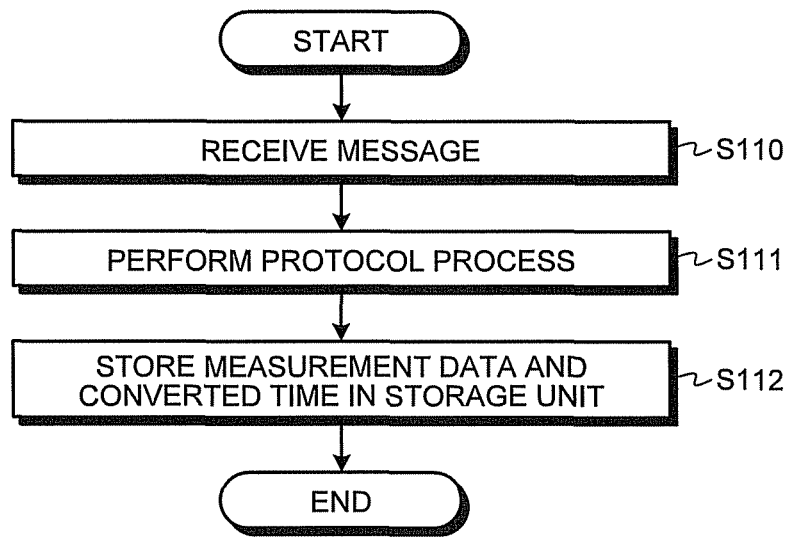

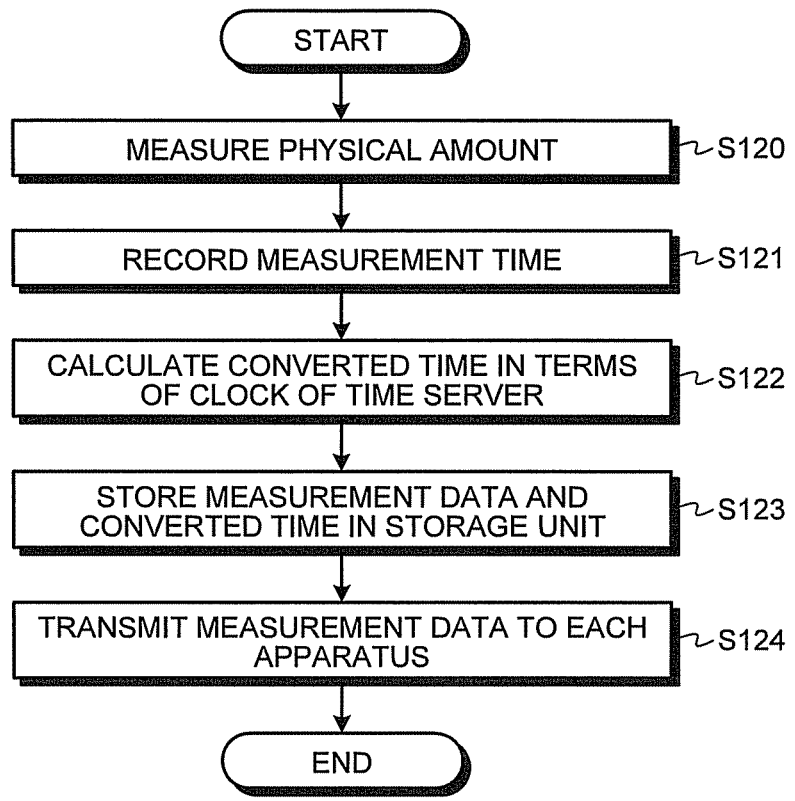

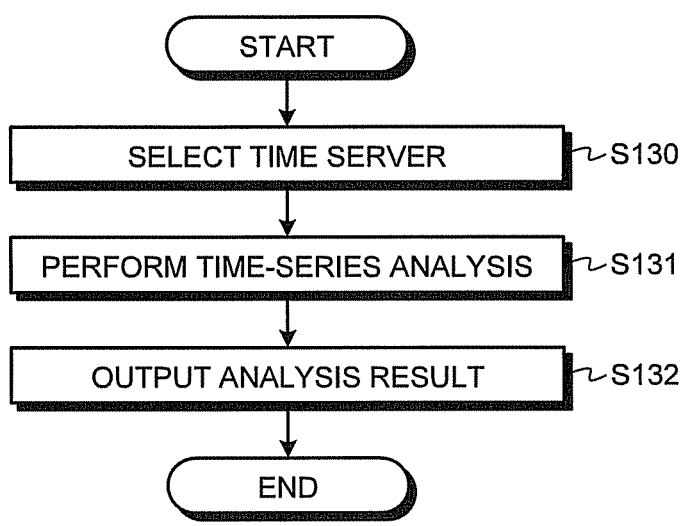
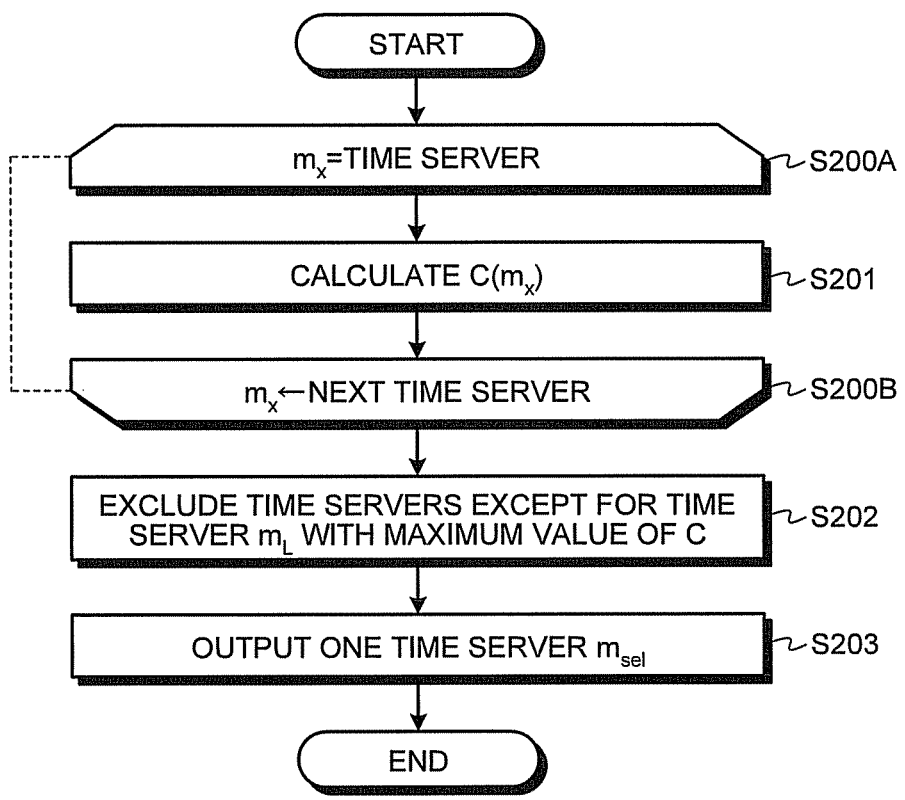

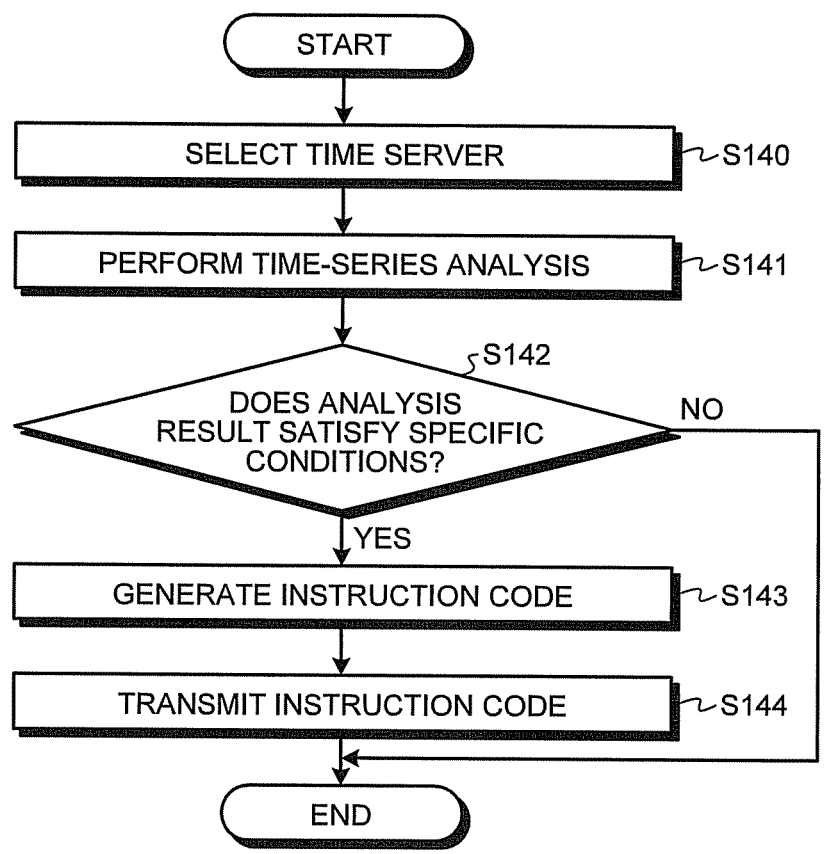

INFORMATION PROCESSING APPARATUS AND COMPUTER PROGRAM PRODUCT

CROSS-REFERENCE TO RELATED APPLICATION

This application is based upon and claims the benefit of priority from Japanese Patent Application No. 2012-070360, filed on Mar. 26, 2012; the entire contents of which are incorporated herein by reference.

FIELD

Embodiments described herein relate generally to an information processing apparatus and a computer program product.

BACKGROUND

A system has been known which is capable of synchronizing time between a plurality of apparatuses with high accuracy. In the system, each of the plurality of apparatuses synchronizes time with the clock of a time server, thereby checking the measurement time thereof. In the system, for example, as a method of improving the operation rate of the system, the time servers are redundantly provided.

When the time servers are redundantly provided, the structure of a system for synchronizing the time between a plurality of time servers becomes complicated.

BRIEF DESCRIPTION OF THE DRAWINGS

FIG. 3 is a schematic diagram illustrating an example of measurement data and each converted time stored in a storage unit according to the first embodiment;

FIG. 4 is a schematic diagram illustrating an example of conversion parameters stored in the storage unit according to the first embodiment;

FIG. 7 is a flowchart illustrating an example of a conversion parameter calculation process according to the first embodiment;

FIG. 8 is a flowchart illustrating an example of the second sequence according to the first embodiment;

FIG. 9 is a flowchart illustrating an example of the third sequence according to the first embodiment;

FIG. 10 is a flowchart illustrating an example of the fourth sequence according to the first embodiment;

FIG. 11 is a flowchart illustrating an example of a time server selection process according to the first embodiment;

FIG. 16 is a flowchart illustrating an example of a power transmission cutting control process according to the second embodiment.

DETAILED DESCRIPTION

According to an embodiment, an information processing apparatus includes a selector. The selector is configured to acquire a first converted time obtained by converting a measurement time of a first piece of measurement data on the basis of a clock of a first time server, a second converted time obtained by converting the measurement time of the first piece of measurement data on the basis of a clock of a second time server, a third converted time obtained by converting a measurement time of a second piece of measurement data on the basis of the clock of the first time server, and a fourth converted time obtained by converting the measurement time of the second piece of measurement data on the basis of the clock of the second time server. The selector is also configured to determine whether an error occurs on the basis of the first, second, third, and fourth converted times, calculate the number of combinations of the first, second, third, and fourth converted times in which it is determined that no error occurs among two or more pieces of measurement data and two or more time servers, and select a time server with the largest number of combinations.

First Embodiment

Hereinafter, an information processing apparatus according to a first embodiment will be described. The information processing apparatus according to the first embodiment receives measurement data and the time when the data is measured from one or more other apparatuses. The time is converted on the basis of the clock of a time server in another apparatus. Hereinafter, the measurement time represented by the time of the information processing apparatus according to the first embodiment or one or more other apparatuses is simply referred to as a measurement time and the time converted by the time server is referred to as a converted time. Other apparatuses obtain two or more converted times which are obtained by converting the measurement time on the basis of the clocks of two or more time servers. That is, the information processing apparatus according to the first embodiment receives two or more converted times from one or more other apparatuses.

The clocks of two or more time servers may not be synchronized with each other. In addition, a plurality of apparatuses which transmit measurement data may perform measurement at different times. Therefore, the information processing apparatus according to the first embodiment is likely to receive a plurality of different converted times for a piece of measurement data.

The information processing apparatus according to the first embodiment selects a time server which is presumed to normally distribute time information among a plurality of time servers. Then, the information processing apparatus performs time-series analysis using, for example, the measurement data and the converted time which is calculated in terms of the clock of the selected time server and outputs the analysis result.

Figure 1:
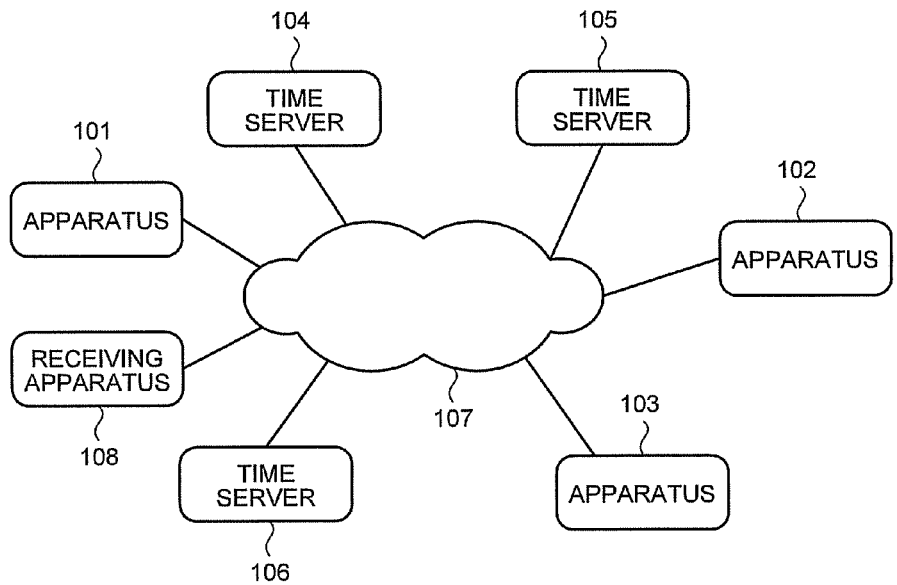
FIG. 1 is a schematic diagram illustrating an example of a system to which an information processing apparatus according to a first embodiment can be applied.

FIG. 1 illustrates an example of a system to which the information processing apparatus according to the first embodiment can be applied. In the example illustrated in FIG.

1, apparatuses 101, 102, and 103, time servers 104, 105, and 106, and a receiving apparatus 108 are connected to a network 107, which is a wide area network, such as the Internet.

The time servers 104, 105 and 106 distribute the current time to the apparatuses 101, 102, and 103 through the network 107. For example, each of the time servers 104, 105, and 106 distributes the current time of the clock provided therein. The times of the clocks provided in the time servers 104, 105, and 106 may not be synchronized with each other.

At least one of the apparatuses 101, 102, and 103 is the information processing apparatus according to the first embodiment. Each of the apparatuses 101, 102, and 103 has a function of measuring, for example, a given physical amount. The apparatuses 101, 102, and 103 transmit the measurement data of the physical amount and the converted time therebetween through the network 107.

In this case, the apparatuses 101, 102, and 103 transmit the converted times obtained by converting the measurement time on the basis of the clocks of the time servers 104, 105, and 106.

Each of the apparatuses 101, 102, and 103 calculates its clock and the time error of the clock of each of the time servers 104, 105, and 106 using the time distributed from each of the time servers 104, 105, and 106. Each of the apparatuses 101, 102, and 103 converts the measurement time indicated by its clock into the converted time which is calculated in terms of the clock of each of the time servers 104, 105, and 106.

In the first embodiment, the apparatuses 101, 102, and 103 transmit three converted times which are calculated in terms of the clocks of the three time servers 104, 105, and 106. However, the invention is not limited thereto. Each of the apparatuses 101, 102, and 103 may check the clocks of at least two time servers (for example, the time servers 104 and 105). In addition, the apparatuses 101, 102, and 103 may transmit the converted times which are calculated in terms of the clocks of two or more time servers.

The apparatuses 101, 102, and 103 transmit and receive the measurement data of the physical amount and three converted times which are obtained by converting the measurement time on the basis of the clocks of the time servers 104, 105, and 106 through the network 107. At least one of the apparatuses 101, 102, and 103 performs time-series analysis using the measurement data and the converted time received through the network 107, and its own measurement data and the converted time corresponding to the measurement data and outputs the analysis result. The analysis result is transmitted to the receiving apparatus 108 through, for example, the network 107. The receiving apparatus 108 performs a predetermined operation according to the received analysis result.

The kind of physical amount measured by the apparatuses 101, 102, and 103 is not particularly limited. Examples of the physical amount measured by the apparatuses 101, 102, and 103 includes the amount of electricity stored, a current, a voltage, a thermal speed, the quantity of water, pressure, temperature, vibration, and humidity. However, the physical amount is not limited thereto. The apparatuses 101, 102, and 103 may measure positional information, such as latitude, longitude, and altitude, as the physical amount.

FIG. 1 illustrates an example in which three apparatuses 101, 102, and 103 are connected to the network 107. However, the invention is not limited to the example illustrated in FIG. 1. That is, in the first embodiment, at least two apparatuses 101 and 102 may be connected to the network 107. In this case, for example, the apparatus 101 receives the measurement data and the converted time from the apparatus 102.

Figure 2:
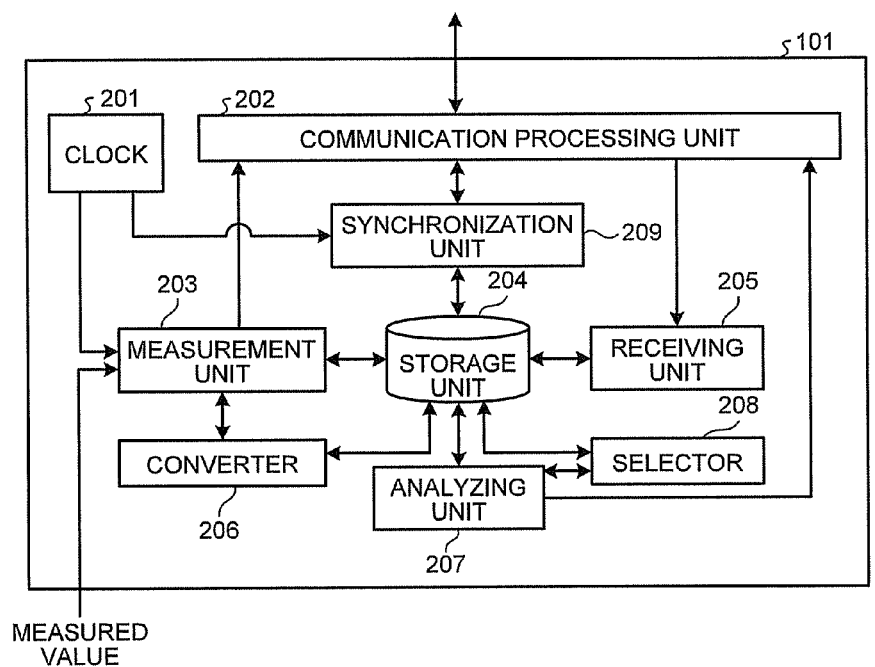
FIG. 2 is a block diagram illustrating an example of the structure of an apparatus serving as the information processing apparatus according to the first embodiment.

FIG. 2 illustrates an example of the structure of the apparatus 101 corresponding to the information processing apparatus according to the first embodiment. Since the apparatuses 101, 102, and 103 can be formed by the common structure, the description of the structure of the apparatuses 102 and 103 will be omitted.

As illustrated in FIG. 2, the apparatus 101 includes a clock 201, a communication processing unit 202, a measurement unit 203, a storage unit 204, a receiving unit 205, a converter 206, an analyzing unit 207, a selector 208, and a synchronization unit 209. The clock 201 includes, for example, an oscillator and a register and outputs the current time to the measurement unit 203 and the synchronization unit 209.

The measurement unit 203 acquires the measurement data of the physical amount from an external measurement device, such as a transformer for measurement. In addition, the measurement unit 203 acquires the time when the measurement data is acquired as the measurement time from the clock 201. Then, the measurement unit 203 outputs the measurement time to the converter 206.

The converter 206 converts the measurement time into each clock distributed from the time servers 104, 105, and 106 to calculate each converted time, according to the following sequence. The measurement unit 203 acquires each converted time which is obtained by converting the measurement time on the basis of each clock from the converter 206 and outputs the acquired converted times and the measurement data corresponding to the converted times to the communication processing unit 202. In addition, the measurement unit 203 stores the measurement data and each converted time in the storage unit 204 so as to be associated with each other.

FIG. 3 illustrates an example of the measurement data measured by the apparatus 101 and each converted time corresponding to the measurement data which are stored in the storage unit 204. In the example, a voltage value and a current value are used as the measurement data. As such, the storage unit 204 stores a piece of measurement data, each converted time (the time of time server #1, the time of time server #2, and the time of time server #3) which is obtained by converting the measurement time using each time distributed from the time servers 104, 105, and 106, and an apparatus ID indicating the apparatus 101 so as to be associated with each other.

The storage unit 204 stores conversion parameters used for conversion from the measurement time to the converted time for each of the time servers 104, 105, and 106.

FIG. 4 illustrates an example of the conversion parameters stored in the storage unit 204. In FIG. 4, the time servers 104, 105, and 106 are represented by time servers #1, #2, and #3, respectively. As illustrated in FIG. 4, for time servers #1, #2, and #3, a time error, a clock ratio, and a synchronization time are used as the conversion parameters. Next, the conversion parameters of time server #1 (time server 104) will be described.

Among the conversion parameters, the time error indicates an error between the clock of the time server 104 and the time output from the clock 201. The synchronization time indicates the time when the time error occurs. For example, if the time error is $\epsilon$ and the time error at a time Tc indicated by the clock 201 is $\epsilon$, the synchronization time is Tc.

The clock ratio indicates the difference between the speed of the time of the clock 201 and the speed of the time of the clock provided in the time server 104. For example, when the apparatus 101 determines that a time of Ds passes in the clock provided in the time server 104 while a time of Dc passes in the clock 201, the clock ratio $\alpha$ of the time server 104 to the clock 201 is Ds/Dc.

The clock ratio α is not limited to this example. For example, the clock ratio Dc/Ds of the clock 201 to the time server 104 may be used. In addition, the storage unit 204 may store a skew instead of the clock ratio α. For example, the skew δ of the clock of the time server 104 with respect to the clock 201 is (Ds/Dc−1). In addition, the storage unit 204 may store a skew value (Dc/Ds−1) of the clock 201 with respect to the clock of the time server 104 instead of δ.

The conversion parameters illustrated in FIG. 4 may not include the clock ratio, the skew, and the synchronization time. In addition, as the conversion parameters, the values of the time error, the clock ratio or the skew, and the synchronization time which are represented by any scale may be used. For example, when the time error is 1 second and a nanosecond scale is used, the storage unit 204 may store a value "1,000,000,000".

That is, the conversion parameters stored in the storage unit 204 are not limited to the above-mentioned values as long as they can be used to convert the time output from the clock 201 into each time which is calculated in terms of the clocks of the time servers 104, 105, and 106.

The communication processing unit 202 performs communication with the network 107 and performs a protocol process based on a communication protocol, such as Ethernet (registered trademark), Transmission Control Protocol (TCP), User Datagram Protocol (UDP), Internet Protocol version 4 (IPv4), or Internet Protocol version 6 (IPv6).

The communication processing unit 202 receives messages which are periodically distributed from each of the time servers 104, 105, and 106 and outputs the time described in each message and information indicating the time server which distributes the time to the synchronization unit 209.

In addition, the communication processing unit 202 receives messages including the measurement data and the converted time from the apparatuses 102 and 103 and outputs the messages to the receiving unit 205. The receiving unit 205 stores the measurement data, the converted time, and an ID indicating a transmission source apparatus which are transmitted from the communication processing unit 202 in the storage unit 204.

The communication processing unit 202 generates a message including the measurement data and each converted time transmitted from the measurement unit 203 and transmits the message to other apparatuses 102 and 103 through the network 107.

Figures 5, 6:
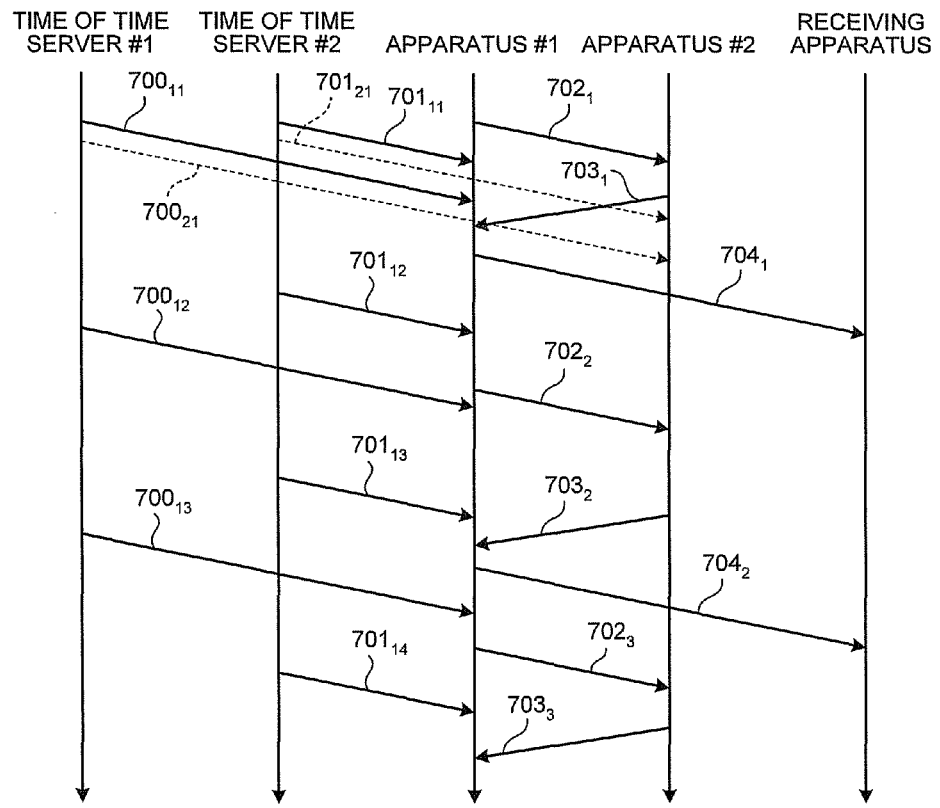
FIG. 5 is a schematic diagram illustrating an example of messages transmitted and received between apparatuses according to the first embodiment.
FIG. 6 is a sequence diagram illustrating an example of first to fourth sequences according to the first embodiment.

FIG. 5 illustrates an example of the message transmitted and received between the communication processing unit 202 and the apparatuses 102 and 103. In this example, the measurement data includes the voltage value and the current value. The message illustrated in FIG. 5 includes the measurement data and each converted time obtained by converting the measurement time on the basis of the clock of each of the time servers 104, 105, and 106. In addition, the "time of time server #1, the time of time server #2, and the time of time server #3" illustrated in FIG. 5 indicate the converted times obtained by converting the measurement time on the basis of the clock of each of the time servers 104, 105, and 106. The converted time "N/A (Not Available)" of time server #2 indicates that the apparatus transmitting the message illustrated in FIG. 5 is not capable of checking the clock of time server #2.

The selector 208 selects a time server which is determined to normally distribute time information among the time servers 104, 105, and 106 using each converted time stored in the storage unit 204. Then, the selector 208 supplies the converted time which is converted using the time of the selected time server to the analyzing unit 207. A method of selecting the time server in the selector 208 will be described in detail below.

The analyzing unit 207 performs time-series analysis on the basis of one or more pieces of measurement data stored in the storage unit 204 and the converted times corresponding to the pieces of measurement data. The analyzing unit 207 analyzes the measurement data using the converted time of the time server selected by the selector 208. The analyzing unit 207 outputs the analysis result to the communication processing unit 202. The communication processing unit 202 transmits the analysis result transmitted from the analyzing unit 207 to, for example, the receiving apparatus 108 through the network 107.

Next, a process according to the first embodiment will be described in detail. The process according to the first embodiment is divided into the following four sequences. Since the processes of the apparatuses 101, 102, and 103 are the same, the description of the processes of the apparatus 102 and the apparatus 103 will be omitted.

(1) First Sequence:

In the first sequence, a time synchronization protocol is used to calculate the conversion parameters for converting the time output from the clock 201 of the apparatus 101 into each time which is calculated in terms of the clock of each of the time servers 104, 105, and 106.

(2) Second Sequence:

In the second sequence, the apparatus 101 receives the message (see FIG. 4) including the measurement data and the converted time from the apparatuses 102 and 103.

(3) Third Sequence:

In the third sequence, the apparatus 101 measures the physical amount, converts the measurement time into the time of the clock of each of the time servers 104, 105, and 106, and transmits the message including the measurement data and each converted time to the apparatuses 102 and 103. In addition, the apparatus 101 stores the measurement data and each converted time in the storage unit 204.

(4) Fourth Sequence:

In the fourth sequence, the apparatus 101 selects one time server which is determined to normally distribute time information among the time servers 104, 105, and 106 using each converted time stored in the storage unit 204, analyzes the measurement data using the converted time which is calculated in terms of the clock of the selected time server, and outputs the analysis result.

The apparatus 101 repeatedly performs the first to fourth sequences. In this case, the first to fourth sequences may be performed at different times. The interval of the fourth sequence may be fixed or it may be changed at an arbitrary time.

Next, the first to fourth sequences according to the first embodiment described in (1) to (4) will be described in detail with reference to the sequence diagram illustrated in FIG. 6. In FIG. 6, time servers #1 and #2 correspond to, for example, the time servers 104 and 105, respectively, and apparatus #1 and apparatus #2 correspond to, for example, the apparatuses 101 and 102, respectively. A receiving apparatus corresponds to, for example, the receiving apparatus 108.

First, (1) First sequence will be described. The first sequence may be performed using a known time synchronization protocol. For example, Network Time Protocol (NTP) or IEEE1588 (Institute of Electrical and Electronics Engineers 1588), and a global positioning system (GPS) have been known as the time synchronization protocol which can be applied to the first sequence.

For example, time server #1 periodically distributes synchronization messages $700_{11}$, $700_{12}$, ... including the current time which is calculated in terms of the clock of time server #1 to apparatus #1 according to the time synchronization protocol. In addition, time server #1 periodically distributes messages $700_{21}$, ... including the current time which is calculated in terms of the clock of time server #1 to apparatus #2. Apparatus #1 receives one or more synchronization messages among the synchronization messages $700_{11}$, $700_{12}$, ... and apparatus #2 receives one or more synchronization messages among the synchronization messages $700_{21}$, ....

Similarly, time server #2 periodically distributes messages $701_{11}$, $701_{12}$, ..., and messages $701_{21}$, ... including the current time which is calculated in terms of the clock of time server #2 to apparatuses #1 and #2. Apparatus #1 receives one or more synchronization messages among the synchronization messages $701_{11}$, $701_{12}$, ... and apparatus #2 receives one or more synchronization messages among the synchronization messages $701_{21}$, .... The clock of the time server #1 and the clock of time server #2 are not necessarily synchronized with each other.

For example, apparatus #1 calculates conversion parameters for time servers #1 and #2 using the times included in the synchronization messages $700_{11}$, $700_{12}$, ..., and the synchronization messages $701_{11}$, ... which are distributed from time servers #1 and #2 and the time output from the clock 201 and stores the conversion parameters in the storage unit 204. Similarly, apparatus #2 calculates conversion parameters for time servers #1 and #2 using the times included in the synchronization messages $700_{21}$, $700_{22}$, ..., and the synchronization messages $701_{21}$, ... which are distributed from time servers #1 and #2 and the time output from the clock of apparatus #2 and stores the conversion parameters.

FIG. 7 is a flowchart illustrating an example of a process for calculating the conversion parameters according to the first embodiment. For example, in the apparatus 101, in Step S100, the communication processing unit 202 receives the synchronization message $700_{11}$ and outputs the synchronization message $700_{11}$ to the synchronization unit 209. The synchronization unit 209 acquires a time Ts included in the supplied synchronization message $700_{11}$. In the next Step S101, the synchronization unit 209 acquires the current time Tr indicated by a clock generated by the clock 201.

In the next Step S102, the synchronization unit 209 stores a difference $\Delta T=Ts-Tr$ between the time Ts of the time server 104 and the time Tr of the apparatus 101 acquired in Step S100 as the time error, which is one of the conversion parameters, in the storage unit 204. In this case, the synchronization unit 209 stores the difference $\Delta T$ in the storage unit 204 so as to be associated with the ID of the time server 104, which is the transmission source of the synchronization message $700_{11}$.

A method of calculating the time error is not limited to the above-mentioned method. For example, it is considered that a process of improving a synchronization system is added to the flowchart illustrated in FIG. 7. For example, the synchronization unit 209 may measure a communication delay Td with the time server 104 and store $\Delta T'=Ts+Td-Tr$ as the time error, which is the conversion parameter, in the storage unit 204.

In addition, the apparatus 101 may apply a regression filter or a low-pass filter to the time included in the synchronization message which is received two or more times from the time server 104 and the time when the synchronization message is received to calculate the clock ratio or skew and store the clock ratio or skew as the conversion parameter in the storage unit 204. In this case, the synchronization unit 209 holds the time Tr as the synchronization time.

Next, (2) Second sequence will be described. FIG. 8 is a flowchart illustrating an example of the second sequence according to the first embodiment. For example, in Step S110, the communication processing unit 202 of the apparatus 101 receives a message $703_1$ including the measurement data and the converted time transmitted from the apparatus 102. In the next Step S111, the communication processing unit 202 performs a predetermined protocol process on the received message $703_1$, extracts the measurement data and the converted time included in the message $703_1$, and outputs the measurement data and the converted time to the receiving unit 205. In the next Step S112, the receiving unit 205 stores the measurement data and the converted time transmitted from the communication processing unit 202 in the storage unit 204 so as to be associated with the apparatus ID indicating the apparatus 102 (see FIG. 3).

The apparatus 102 transmits the messages $703_1$, $703_2$, ... to the apparatus 101 whenever the measurement data for measuring the physical amount is generated. The apparatus 101 performs the second sequence whenever receiving the messages $703_1$, $703_2$, ... transmitted from the apparatus 102.

The second sequence is performed by a plurality of apparatuses 101, 102, and 103. For example, the apparatus 102 receives a message $702_1$ including the measurement data and the converted time transmitted from the apparatus 101. Then, the apparatus 102 extracts the measurement data and the converted time from the received message $702_1$ and stores the measurement data and the converted time. The process of the apparatus 102 according to the second sequence is performed, for example, whenever the apparatus 102 receives the messages $702_1$, $702_2$, ... transmitted from the apparatus 101.

Next, (3) Third sequence will be described. FIG. 9 is a flowchart illustrating an example of the third sequence according to the first embodiment. In Step S120, for example, the measurement unit 203 of the apparatus 101 measures the physical amount.

The measurement unit 203 may be an A/D converter. In this case, for example, an analog measurement signal output from an external measurement device is input to the measurement unit 203 and is converted into a digital measurement signal. The measurement unit 203 samples the digital measurement signal at a predetermined time and acquires the value obtained by sampling as a measured value. The measurement unit 203 may be a digital filter. In this case, the measurement unit 203 applies a digital filter to a digital signal which is input from the outside and acquires the measured value.

In the next Step S121, the measurement unit 203 acquires the time when the physical amount is measured in Step S120 from the clock 201. The process in Step S121 may be performed simultaneously with the process in Step S120. When the measurement time is acquired in Step S121, the process proceeds to Step S122.

In Step S122, the measurement unit 203 reads the conversion parameters stored in the storage unit 204 in the first sequence and converts the measurement time acquired in Step S121 on the basis of the clock of each of the time servers 104, 105, and 106 to calculate each converted time.

For example, when the conversion parameter is only the time error $\epsilon$, which is the difference between the clock of the time server and the clock generated by the clock 201, a converted time Tv is calculated as $Tv=\epsilon+Tm$. The value Tm is the measurement time acquired by the measurement unit 203 in Step S122.

For example, when the conversion parameters includes the time error $\epsilon$, the clock ratio $\alpha$ of the time server to the clock 201, and the synchronization time Tc, the converted time Tv is calculated as $Tv=Tm+\epsilon+\alpha\times(Tm-Tc)$.

For example, when the conversion parameters include the skew $\delta$ of the time server with respect to the clock generated by the clock 201, the converted time Tv is calculated as Tv=Tm+$\epsilon$+($\delta$+1)×(Tm−Tc).

When the converted time is calculated in Step S122, the process proceeds to Step S123. In Step S123, the measurement unit 203 stores the measurement data acquired in Step S120, each converted time which is obtained in Step S122 by converting the measurement time on the basis of the clock of each of the time servers 104, 105, and 106, and the apparatus ID indicating the apparatus 101 in the storage unit 204 so as to be associated with each other (see FIG. 3).

In the next Step S124, the measurement unit 203 transmits the measurement data and each converted time to the communication processing unit 202. The communication processing unit 202 performs a predetermined protocol process to generate a message including the measurement data and each converted time, and transmits the generated message to the apparatus 102 through the network 107 (for example, the message $702_1$ illustrated in FIG. 6). Similarly, the communication processing unit 202 transmits the message to the apparatus 103 through the network 107.

When the communication processing unit 202 and the network 107 have a multicast function, the communication processing unit 202 may transmit one message to the network 107, instead of transmitting the messages to the apparatuses 102 and 103. In this case, a transmitting apparatus (not illustrated) of the network 107 copies the message and transmits the copied messages to the apparatuses 102 and 103.

Next, (4) Fourth sequence will be described. FIG. 10 is a flowchart illustrating an example of the fourth sequence according to the first embodiment. In Step S130, for example, the selector 208 of the apparatus 101 performs analysis on the basis of each converted time stored in the storage unit 204, selects one time server which is presumed to be normal from the time servers 104, 105, and 106, and transmits information indicating the selected time server to the analyzing unit 207. The time server selection process in Step S130 will be described in detail below.

In the next Step S131, the analyzing unit 207 performs time-series analysis using the measurement data stored in the storage unit 204. For example, the analyzing unit 207 performs the time-series analysis using the converted time which is calculated in terms of the clock of the time server selected by the selector 208 in Step S130 among the converted times corresponding to the measurement data.

In the next Step S132, the analyzing unit 207 outputs the result of the time-series analysis in Step S131 to the communication processing unit 202. The communication processing unit 202 transmits the analysis result to, for example, the receiving apparatus 108. Messages $704_1$ and $704_2$ illustrated in FIG. 6 are examples of the message which includes the analysis result and is transmitted from the apparatus 101 to the receiving apparatus 108.

In Step S132, for example, the message $704_1$ transmitted to the receiving apparatus 108 may include an instruction to instruct the receiving apparatus 108 to perform a specific operation. The instruction code is, for example, digital data indicating the type of predetermined instruction. In this case, the receiving apparatus 108 performs a predetermined protocol process on the received message $704_1$ and extracts the instruction code from the message $704_1$. Then, the receiving apparatus 108 performs an operation according to the extracted instruction code.

Next, the time server selection process in Step S130 will be described in detail. FIG. 11 is a flowchart illustrating an example of the time server selection process according to the first embodiment. In the first embodiment, the selector 208 selects a time server using a converted time $T(m_x, n_y, k_z)$ in the past predetermined period among the converted times stored in the storage unit 204. It is assumed that the converted time $T(m_x, n_y, k_z)$ is obtained by converting a $k_z$-th measurement time of an apparatus $n_y$ on the basis of the clock of a time server $m_x$.

As illustrated in Step S200A, Step S200B, and Step S201, the selector 208 repeatedly performs the process in Step S201 for a plurality of time servers $m_x$ (for example, the time servers 104, 105, and 106).

In Step S201, the selector 208 calculates a function $C(m_x)$ indicating the number of sets of a time server $m_a$, an apparatus $n_b$, an apparatus $n_c$, $k_i$, and $k_j$ satisfying the following Relation (1) for the time server $m_x$. In the following description, when the total number of target time servers is p and the total number of target apparatuses is q, a=1, 2, ..., p and b and c=1, 2, ..., q are established.

$$m_a \neq m_x \wedge (n_b \neq n_c \vee k_i \neq k_j) \wedge \{\text{there are values of } T(m_x, n_b, k_i), T(m_x, n_c, k_j), T(m_a, n_b, k_i), \text{and } T(m_a, n_c, k_j)\} \wedge \{T(m_x, n_b, k_i) \leq T(m_x, n_c, k_j)\} \wedge \{T(m_a, n_b, k_i) \leq T(m_a, n_c, k_j)\} \wedge \{|F(m_x, m_a, n_b, n_c, k_i, k_j)| < \gamma\} \quad (1)$$

A function F is defined as illustrated in the following Equation (2):

$$F(m_x, m_a, n_b, n_c, k_i, k_j) = \{T(m_x, n_c, k_j) - T(m_x, n_b, k_i)\} - \{T(m_a, n_c, k_j) - T(m_a, n_b, k_i)\} \quad (2)$$

The threshold value $\gamma$ is a predetermined positive value. In Relation (1), an inequality sign "<" for determination using the threshold value $\gamma$ may be an inequality sign "≤".

Figure 12:
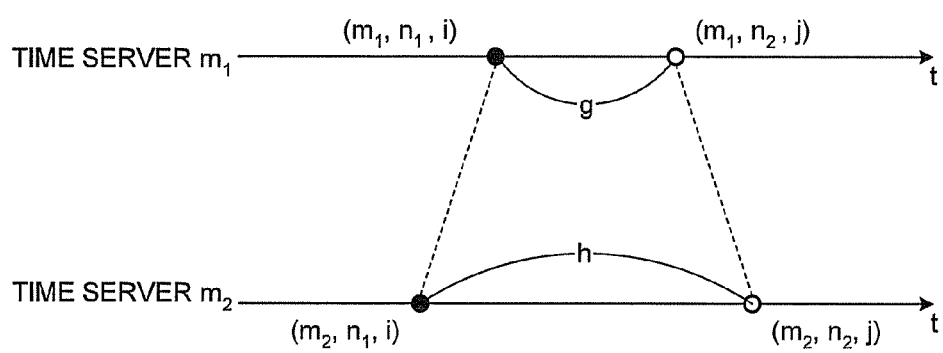
FIG. 12 is a schematic diagram illustrating the time server selection process according to the first embodiment.

Next, the meaning of Relation (1) and Equation (2) will be described with reference to FIG. 12. A time $T(m_1, n_1, i)$ is a converted time obtained by converting the i-th measurement time of the apparatus $n_1$ on the basis of the clock of the time server $m_1$. A time $T(m_1, n_2, j)$ is a converted time obtained by converting the j-th measurement time of the apparatus $n_2$ on the basis of the clock of the time server $m_1$. In this example, it is assumed that the time $T(m_1, n_1, i)$<the time $T(m_1, n_2, j)$ is satisfied according to the conditions illustrated in the above-mentioned Relation (1). A difference g is calculated by subtracting the time $T(m_1, n_1, i)$ from the time $T(m_1, n_2, j)$. The difference g is a time obtained by converting the interval between the time when a first piece of measurement data is measured and the time when a second piece of measurement data is measured on the basis of the clock of the time server $m_1$.

Similarly, a time $T(m_2, n_1, i)$ and a time $T(m_2, n_2, j)$ are converted times obtained by converting the i-th measurement time of the apparatus $n_1$ and the j-th measurement time of the apparatus $n_2$ on the basis of the clock of the time server $m_2$, respectively. In this case, it is assumed that the time $T(m_2, n_1, i)$<the time $T(m_2, n_2, j)$ is satisfied according to the conditions illustrated in the above-mentioned Relation (1). A difference h is calculated by subtracting the time $T(m_2, n_1, i)$ from the time $T(m_2, n_2, j)$. The difference h indicates the interval between the time when the first piece of measurement data is measured and the time when the second piece of measurement data is measured. However, the difference h differs from the difference g in that it indicates the converted time which is calculated in terms of the clock of the time server $m_2$.

A function F in Equation (2) is for calculating the difference between the difference g and the difference h and Relation (1)' compares the value of the function F with the threshold value $\gamma$. That is, the difference between the converted time of the first piece of measurement data and the converted time of the second piece of measurement data is calculated using the converted times which are calculated in terms of the clocks of two time servers. Then, a second difference is calculated for each first difference which is calculated in terms of the clocks of the two time servers. When the second difference is greater than a given value (threshold value γ), it is possible to presume that at least one of the two time servers is unreliable.

Then, the selector 208 performs determination using the threshold value γ for all combinations of each time server $m_a$ other than a time server $m_x$, each apparatus $n_b$, and each measurement time k of each apparatus $n_b$, and calculates the number of sets $C(m_x)$ satisfying the conditions for the time server $m_x$. In addition, the selector 208 sequentially changes the time server $m_x$ to calculate the value of the function $C(m_x)$ (Step S200A, Step S201, and Step S200B in FIG. 11).

After the selector 208 calculates the value of the function $C(m_x)$ for a plurality of time servers $m_x$, the process proceeds to Step S202. In Step S202, the selector 208 leaves one or more time servers (hereinafter, referred to as $m_L$) with the maximum value of the function $C(m_x)$ as candidates and excludes the other time servers from the candidates. Then, in the next Step S203, the selector 208 selects one time server (hereinafter, referred to as $m_{sel}$) from one or more time servers $m_L$ which remain as candidates in Step S202. Then, the selector 208 outputs information indicating the time server $m_{sel}$ to the analyzing unit 207.

In Step S203, the selector 208 may select any time server from the time servers $m_L$ which remain as the candidates. For example, in Step S203, the selector 208 may randomly select one time server $m_{sel}$ from one or more time servers which are set as the candidates. As another method, the priority of each time server may be predetermined and stored in, for example, the storage unit 204. In Step S203, the selector 208 may selects a time server with the highest priority as the time server $M_{sel}$, with reference to the priorities stored in the storage unit 204.

In addition, in Step S203, the selector 208 may perform determination using a threshold value θ in the following Relation (3) and exclude the time server $m_x$ satisfying the conditions from the candidates. In this way, when any time server other than the time server $m_x$ recognizes that an error is likely to occur in the time server $m_x$, it is possible to exclude the time server $m_x$. Therefore, it is possible to reduce the number of target time servers and improve a processing speed.

$$\exists n_b, n_c, k_i, k_j, \forall m_a \ne m_x, \{(m_x, n_b, k_i) \le (m_x, n_c, k_j)\} \wedge \{|F(m_x, m_a, n_b, n_c, k_i, k_j)| > \theta\} \quad (3)$$

Determination using Relation (3) is not limited to Step S203, but it may be performed in any step in the flowchart illustrated in FIG. 11.

A case is considered in which there is no time server $m_L$ to be set as the candidate as a result of the process in Step S203. In this case, the selector 208 may output information indicating that there is no time server $m_L$ to be set as the candidate to the analyzing unit 207.

Step S200A, Step S201, and Step S200B calculate the number of times the converted times converted by the time servers $m_x$ and $m_a$ ($m_x \ne m_a$) are not inconsistent for a set of two arbitrary different pieces of measurement data. Therefore, Step S200A, Step S201, and Step S200B make it possible to increase the possibility that the time server which is presumed to have the least inconsistency will be selected. In addition, Step S200A, Step S201, and Step S200B increase the possibility that the time server with the smallest number of times the converted time is unclear will be selected.

Figure 13:
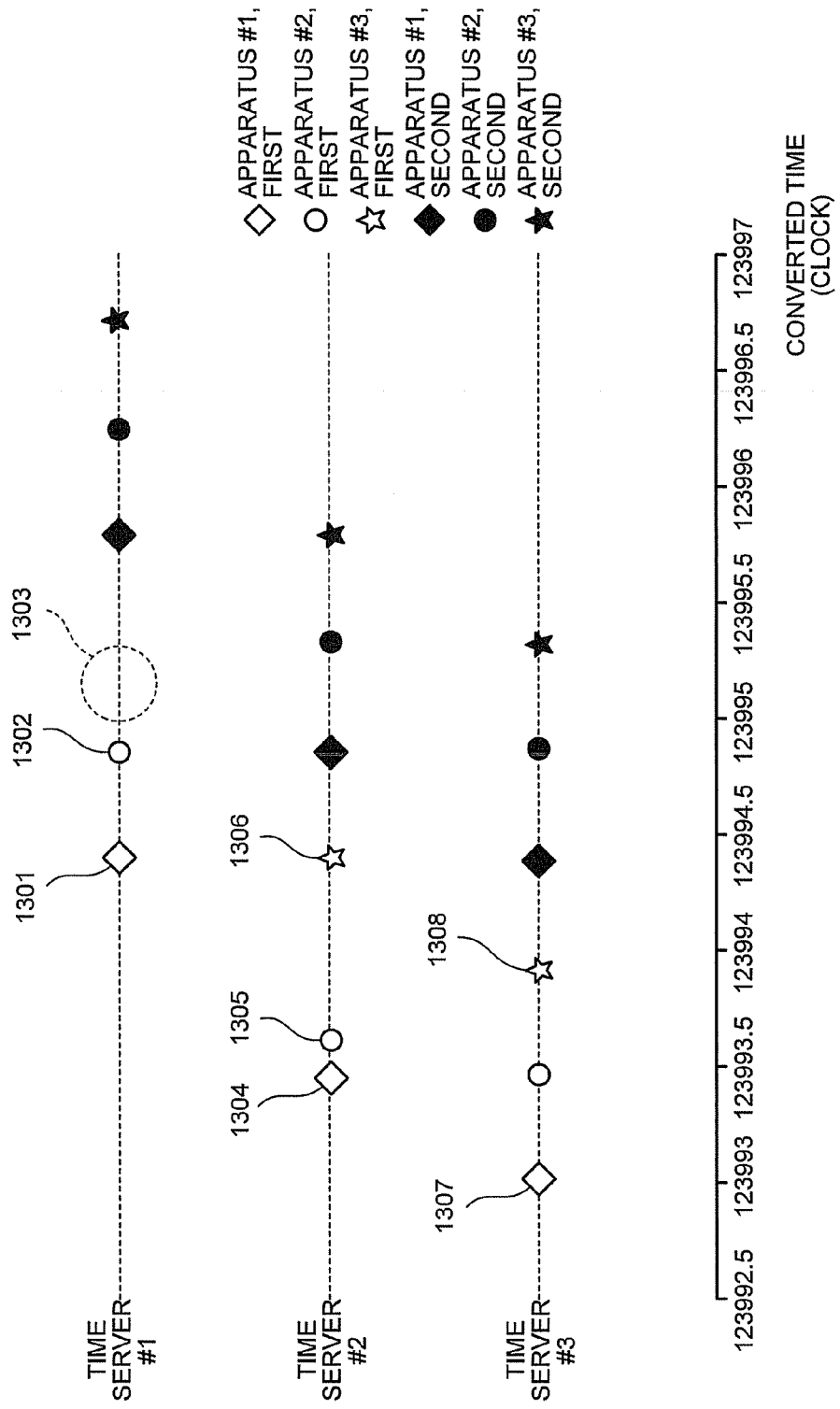
FIG. 13 is a schematic diagram illustrating the time server selection process according to the first embodiment.

FIG. 13 illustrates an example of the converted times obtained by converting the measurement times which are measured two times by each of two apparatuses #1 and #2 on the basis of the clocks of time servers #1, #2, and #3. In FIG. 13, symbols of white rhombus and black rhombus indicate the first and second measurement times of apparatus #1 (for example, the apparatus 101), respectively. Symbols of white circle and black circle indicate the first and second measurement times of apparatus #2 (for example, apparatus 102), respectively. Similarly, symbols of white star and black star indicate the first and second measurement times of apparatus #3 (for example, the apparatus 103), respectively.

In FIG. 13, the horizontal axis indicates the converted time which is calculated in terms of the clock of each time server. Time servers #1, #2, and #3 are, for example, the time servers 104, 105, and 106, respectively. Lines of time servers #1, #2 and #3 indicate the converted times which are calculated in terms of the clocks of time servers #1, #2, and #3, respectively. In this case, since the clocks of time servers #1 to #3 are not synchronized with each other, the positions of the converted times are likely to be different from each other for the same measurement data.

For example, in FIG. 13, points 1301, 1304, and 1307 represented by the symbol of white rhombus indicates the first measurement time of apparatus #1. If time servers #1 to #3 are synchronized with each other, the points 1301, 1304, and 1307 are plotted at the position of the same converted time. However, as illustrated in FIG. 13, when time servers #1 to #3 are not synchronized with each other, the points 1301, 1304, and 1307 are plotted at the positions of different converted times.

In FIG. 13, the point 1303 indicates that the time obtained by converting the measurement time of the first piece of measurement data of apparatus #3 on the basis of the clock of time server #1 is unclear.

In the example illustrated in FIG. 13, the time from the first converted time (point 1304) of apparatus #1 which is calculated in terms of the clock of time server #2 to the first converted time (point 1306) of apparatus #3 which is calculated in terms of the clock of time server #2 is substantially equal to the time from the first converted time (point 1307) of apparatus #1 which is calculated in terms of the clock of time server #3 to the first converted time (point 1308) of apparatus #3 which is calculated in terms of the clock of time server #3, and the absolute value of the difference therebetween is less than the threshold value γ. The function $C(m_x)$ counts all sets of the time server, the apparatus, and the measurement time having the above-mentioned relationship therebetween.

There is a large difference between the time from the first converted time (point 1301) of apparatus #1 which is calculated in terms of the clock of time server #1 to the first converted time (point 1302) of apparatus #2 which is calculated in terms of the clock of time server #1 and the time from the first converted time (point 1304) of apparatus #1 which is calculated in terms of the clock of time server #2 to the first converted time (point 1305) of apparatus #2 which is calculated in terms of the clock of time server #2 and the absolute value of the difference therebetween is greater than the threshold value γ. The number of sets is not added to the function C (time server #2).

When all measurement times illustrated in FIG. 13 are subjected to the time server selection process in Step S130 of FIG. 10, the value of the function C is equal to or less than 45. That is, in FIG. 13, there are six types of measurement times and three time servers #1, #2, and #3 are used. Therefore, a set of points used to calculate the function C is Combination (6, 2)×Combination (3, 2)=45.

Here, Combination (x, y) is the number of combinations for selecting y items from x items.

In FIG. 13, the value of each function $C(m_x)$ is as follows. For time server #1, the function C (time server #1) is 16. For time server #2, the function C(time server #2) is 16. For time server #3, the function C(time server #3) is 19. Therefore, time server #3 with the maximum value of the function C is selected by Step S202 and Step S203 of FIG. 11.

When the absolute value of the difference between the time from the point 1301 to the point 1302 and the time from the point 1304 to the point 1305 is greater than the threshold value γ, time server #2 may be excluded from the candidates by determination using the above-mentioned Relation (3).

Figure 14:
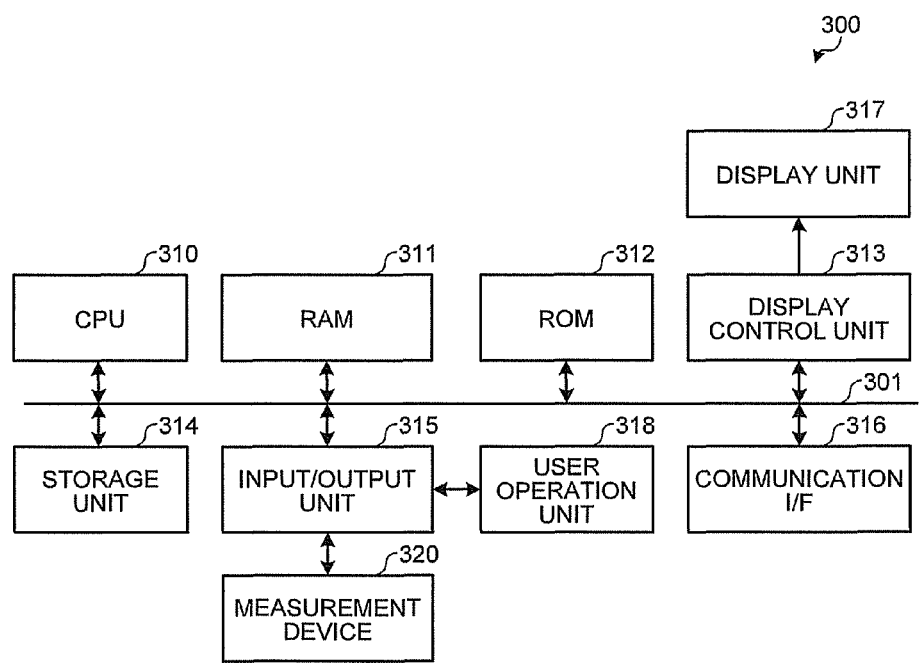
FIG. 14 is a block diagram illustrating an example of the structure of an information processing apparatus which can be applied to the apparatus according to the first embodiment.

FIG. 14 illustrates an example of the structure of an information processing apparatus 300 according to the first embodiment which can be applied to the apparatuses 101, 102, and 103. The information processing apparatus 300 includes a central processing unit (CPU) 310, a random access memory (RAM) 311, a read only memory (ROM) 312, a display control unit 313, a storage unit 314, an input/output unit 315, and a communication I/F (interface) 316 which are connected by a bus 301 so as communicate with each other.

The storage unit 314 is a rewritable high-capacity storage medium, such as a hard disk drive, a solid state disk (SSD), or a non-volatile semiconductor memory, and stores an OS for operating the CPU, various kinds of application programs, and various kinds of data. The storage unit 204 illustrated in FIG. 2 is included in the storage unit 314. However, the invention is not limited thereto, but the storage unit 204 may be the RAM 311.

The CPU 310 uses the RAM 311 as a work memory according to the program which is stored in the storage unit 314 or the ROM 312 in advance, thereby controlling the overall operation of the information processing apparatus 300. The clock 201, the measurement unit 203, the receiving unit 205, the converter 206, the analyzing unit 207, the selector 208, and the synchronization unit 209 which are illustrated in FIG. 2 and are for implementing the functions of the apparatus 101, 102, or 103 may be configured as modules of the program which operates on the CPU 310. In addition, some functions of the communication processing unit 202 may be configured as the modules of the program.

The display control unit 313 is connected to a display unit 317 including a display device, such as a liquid crystal display (LCD), and converts a display control signal which is generated by the CPU 310 according to the program into a signal which can be displayed by the display device. The display unit 317 may be provided in the information processing apparatus 300, or it may be connected to the outside and then used.

The input/output unit 315 is connected to a user operation unit 318 that receives an operation from the user. The user operation unit 318 includes a pointing device, such as a mouse, and a keyboard.

In addition, the input/output unit 315 includes an interface with a measurement device 320 that measures the physical amount. For example, the input/output unit 315 includes an A/D converter, converts an analog measurement signal output from the measurement device 320 into a digital measurement signal, and transmits the digital measurement signal to the CPU 310.

However, the invention is not limited thereto. The input/output unit 315 may include a communication interface for data transmission, such as a universal serial bus (USB) or IEEE (Institute of Electrical and Electronics Engineers) 1394, and may be connected to the measurement device 320 through the communication interface. In this case, a digital measurement signal is output as the measured output of the measurement device 320.

The input/output unit 315 may further include a drive device that reads and writes data from and to a disk storage medium, such as a compact disk (CD) or a digital versatile disk (DVD). A program for configuring the information processing apparatus 300 as the apparatus 101, 102, or 103 is stored in, for example, a CD or a DVD and is then provided. The drive device reads the program and stores the program in, for example, the storage unit 314. In this way, the program is installed in the information processing apparatus 300. The program may be provided to the apparatus 101, 102, and 103 through the network 107.

The communication I/F 316 controls communication with the network 107 under the control of the CPU 310. The communication processing unit 202 illustrated in FIG. 2 is a function on the communication I/F 316. The communication I/F 316 can control the operation of, for example, the CPU 310 in response to instructions transmitted from the outside through the network or using its own operation.

The program which is executed by the apparatus 101 and implements the functions of the information processing apparatus according to the first embodiment has a module structure including the above-mentioned units (the clock 201, the measurement unit 203, the receiving unit 205, the converter 206, the analyzing unit 207, the selector 208, and the synchronization unit 209). As the actual hardware, the CPU 310 reads the program from the storage unit 314 and executes the program. Then, each unit is loaded on the RAM 311, which is a main storage device, and the clock 201, the measurement unit 203, the receiving unit 205, the converter 206, the analyzing unit 207, the selector 208 and the synchronization unit 209 are generated on the main storage device.

As described above, according to the first embodiment, determination using the threshold value γ is performed for all combinations of target time servers other than a reference time server, apparatuses, and the measurement times of the apparatuses, thereby calculating the number of sets C satisfying the conditions. In addition, the determination using the threshold value γ is performed for the target time servers while sequentially changing the target time servers to the reference time server, thereby calculating each function C. Then, one or more time servers with the maximum value of the function C among all of the calculated functions C remain as the candidates and a time server is selected from the candidates. Therefore, even when the time servers are not synchronized with each other and an error occurs in the time server, it is possible to check the difference between the measurement times of different apparatuses.

Second Embodiment

Figure 15:
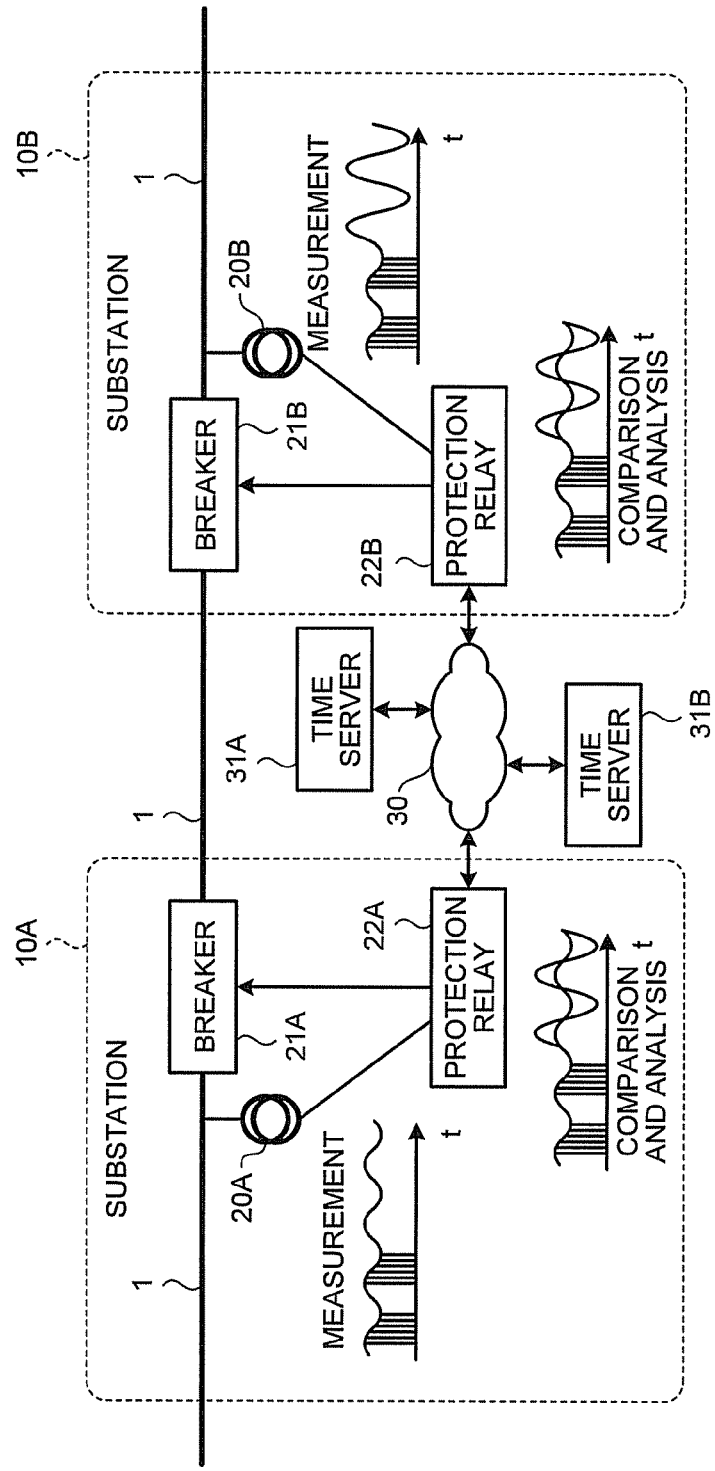
FIG. 15 is a schematic diagram illustrating an example of the structure of a power line protection system according to a second embodiment.

Next, a second embodiment will be described. In the second embodiment, the first embodiment is applied to a power line protection system. FIG. 15 illustrates an example of the structure of the power line protection system according to the second embodiment. A substation 10A and a substation 10B transmit power through a power line 1 between two points that are several kilometers to several tens of kilometers or more away from each other. The substation 10A and the substation 108 includes transformers 20A and 20B for measurement, breakers 21A and 21B, and protection relays 22A and 22B, respectively. The protection relays 22A and 22B correspond to the apparatuses 101 and 102 according to the first embodiment.

In the substation 10A, the protection relay 22A is connected to the power line 1 through the transformer 20A for measurement which is provided at one end of the power line 1. The breaker 21A cuts one end of the power line 1 according to a trip signal supplied from the protection relay 22A. Similarly, the protection relay 22B is connected to the power line 1 through the transformer 20B for measurement which is provided at the other end of the power line 1. The breaker 21B cuts the other end of the power line 1 according to a trip signal supplied from the protection relay 22B.

The protection relays 22A and 22B are connected to a network 30, which is a wide area network, such as a dedicated network or the Internet. In addition, a plurality of time servers 31A and 31B that distribute time information on the basis of each clock are connected to the network 30. The protection relays 22A and 22B and the time servers 31A and 318 can communicate with each other through the network 30. The time servers 31A and 31B are not necessarily synchronized with each other.

The protection relays 22A and 22B measure the current and voltage of the power line 1 at the one end and the other end of the power line 1 on the basis of the outputs of the transformers 20A and 20B for measurement and obtain measurement data. The protection relays 22A and 22B transmit and receive the measurement data therebetween through the network 30 and compares and analyzes the currents and voltages at the one end and the other end in time series. When a transmission error in the power line 1 is detected, the protection relays 22A and 22B output the trip signal to the breakers 21A and 21B. In this way, the transmission of power is cut at the one end and the other end of the power line 1 and the power line is protected.

In the system, when the transmission of power is cut due to the detection of an error, it is necessary to cut both ends of the power line 1 at the same time. Therefore, in the second embodiment, the protection relays 22A and 22B select the optimal time server from a plurality of time servers 31A and 31B connected to the network 30 according to the first to fourth sequences described in the first embodiment. Then, the protection relays 22A and 22B analyze the measurement data in time series on the basis of the clock of the selected time server and detect errors.

FIG. 16 is a flowchart illustrating an example of a power transmission control process according to the second embodiment. In Step S140, similarly to Step S130 in the flowchart illustrated in FIG. 10, at least one of the protection relays 22A and 22B selects one time server from the plurality of time servers 31A and 31B. Here, it is assumed that the protection relay 22A performs the selection process.

Specifically, the protection relays 22A and 22B receive synchronization messages $700_{11}$, $700_{12}$, . . . and synchronization messages $700_{21}$, . . . from the time servers 31A and 31B, calculate the time error, and obtain conversion parameters according to the flowchart illustrated in FIG. 7.

In addition, the protection relays 22A and 22B measure the currents and voltages of the one end and the other end of the power line 1 on the basis of the outputs of the transformers 20A and 20B for measurement and obtain the measurement data according to the flowcharts illustrated in FIGS. 8 and 9. The protection relays 22A and 22B acquire the converted times obtained by converting the measurement time on the basis of the clocks of the time servers 31A and 31B. The protection relays 22A and 22B transmit and receive the acquired measurement data and converted times therebetween.

Then, the protection relays 22A and 22B perform calculation using Relation (1) to select one time server from the plurality of time servers 31A and 31B according to the flowchart illustrated in FIG. 11. That is, the difference between the times measured by the protection relays 22A and 22B at different times is calculated as the difference between the converted times which are calculated in terms of the clocks of the time servers 31A and 31B. Then, the difference between the difference based on the clock of the time server 31A and the difference based on the clock of the time server 31B is calculated and determination using the threshold value $\gamma$ is performed for the difference. Then, one time server (time server 31A) is selected from the plurality of time servers 31A and 31B on the basis of the determination result.

In the next Step S141, each of the protection relays 22A and 22B analyzes the measurement data in time series on the basis of the converted time which is calculated in terms of the clock of the time server 31A selected by calculation using Relation (1). Then, in Step S142, it is determined whether the result of the time-series analysis satisfies specific conditions and errors are detected.

A method of performing the time-series analysis and a method of determining the analysis result in Step S141 and Step S142 are not particularly limited. For example, the protection relays 22A and 22B compare the waveforms of AC currents indicated by the measurement data of the output from the transformer 20A for measurement by the protection relay 22A, the measurement data of the output from the transformer 20B for measurement by the protection relay 22B, the converted times which correspond to the pieces of measurement data and are calculated in terms of the clock of the time server 31A for a predetermined period. As a result of the comparison, the protection relays 22A and 22B use a logical value indicating whether the difference therebetween is greater than a predetermined value as the analysis result.

In Step S142, when it is determined that the analysis result does not satisfy the specific conditions, the protection relays 22A and 22B determine that an error occurs in power transmission and perform no process.

When it is determined in Step S142 that the analysis result satisfies predetermined conditions, the protection relays 22A and 22B determine that an error occurs in power transmission and performs Step S143. In Step S143, the protection relay 22A generates an instruction code for outputting a trip signal to the breaker 21A. Similarly, the protection relay 22B generates an instruction code for outputting a trip signal to the breaker 21B.

In the next Step S144, the protection relay 22A transmits the trip signal to the breaker 21A according to the instruction code generated in Step S143. Similarly, the protection relay 22B transmits the trip signal to the breaker 21B according to the instruction code generated in Step S143.

As such, according to the second embodiment, even when an error occurs in the time server, it is possible to check the difference between the measurement times between two points that are away from each other, on the basis of the time information distributed from a plurality of time servers which are not synchronized with each other.

Other Embodiments

In the above-described second embodiment, the apparatuses 101, 102, and 103 according to the first embodiment are applied to the protection relays 22A and 22B of the power line protection system, but the invention is not limited thereto. That is, the apparatuses 101, 102, . . . according to the first embodiment may be applied to an apparatus control device, an error detecting device, a server on a cloud service, a home gateway, and other electronic apparatuses.

For example, when the apparatuses 101, 102, . . . according to the first embodiment are applied to a control device in factory automation, the analyzing unit 207 outputs the amount of control to, for example, a manufacturing apparatus according to the state of a factory process represented by the measurement data and the converted times of the apparatuses 101, 102, and 103 for a predetermined period.

For example, when the apparatuses 101, 102, ... according to the first embodiment are applied to a storage battery control device, the analyzing unit 207 transmits an instruction message for controlling the amount of charge or the amount of discharge of a storage battery, the direction of a solar panel, or the generation of power according to the quantity of electricity represented by the measurement data and the converted times of the apparatuses 101, 102, ....

For example, when the apparatuses 101, 102, ... according to the first embodiment are applied to a solar panel control device or a wind power generation control device, the analyzing unit 207 transmits an instruction message indicating the stop or resumption of power generation according to the quantity of electricity represented by the measurement data and the converted times of the apparatuses 101, 102, ....

The apparatuses 101, 102, ... may not have a function of measuring the physical amount and transmitting the measurement data and the converted time. That is, for example, the apparatus 101 may not include some or all of the clock 201, the measurement unit 203, the converter 206, and the synchronization unit 209 illustrated in FIG. 2. In this case, the apparatus 101 analyzes the measurement data and the converted time received from the apparatus 102 and the apparatus 103 and outputs the analysis result.

For example, the communication processing unit 202 of the apparatus 101 may have a function of transmitting data, and the analyzing unit 207 may have a function of analyzing time-series data for the traffic or communication delay of the network 107 and transmitting the analysis result to the receiving apparatus 108. In this case, when receiving messages other than a message having the measurement data described therein, a synchronization message, and an instruction message through the network 107, the communication processing unit 202 transmits the messages to the network 107. In this case, even when the time servers are not synchronized with each other, it is possible to analyze the time-series data for traffic between the apparatuses 101, 102, ... and communication delay on the network 107.

For example, the apparatus 101 may include an output unit that outputs data or signals to an external apparatus (not illustrated), in addition to the communication processing unit 202. When the result of time-series analysis satisfies specific conditions, the apparatus 101 may transmit a predetermined signal or instruction message to the external apparatus. For example, when the apparatus 101 is a protection relay, the apparatus 101 is connected to the breaker 21A and the analyzing unit 207 transmits the trip signal to the breaker 21A through the output unit.

For example, the apparatus 101 may transmit different messages including the measurement data and the converted time. For example, the apparatus 101 may transmit a plurality of messages in which a plurality of kinds of measurement data are separately included.

The network 107 may be a local area network (LAN), a mesh network, or the Internet. In addition, a portion of or the entire network 107 may be configured by a wireless network. The measurement data may be, for example, the quantity of electricity, or it may be physical amounts including the amount of electricity stored, a speed, the quantity of water, pressure, temperature, vibration, humidity, and positional information, such as latitude, longitude, or altitude.

The apparatuses 101, 102, ... may also serve as time servers. For example, when the apparatus 101 also serves as the time server 104, it is considered that the synchronization unit 209 of the apparatus 101 transmits a synchronization message to the apparatuses 102 and 103 through the communication processing unit 202 and the network 107. In this case, it is possible to control traffic between the time server 104 and the apparatus 101. In addition, it is possible to reduce the number of apparatuses in the entire system.

In FIG. 3, a plurality of different kinds of physical amounts (current and voltage) are measured at the same time. However, the invention is not limited thereto. That is, in each embodiment, a plurality of different kinds of physical amounts may be measured at different times.

While certain embodiments have been described, these embodiments have been presented by way of example only, and are not intended to limit the scope of the inventions. Indeed, the novel apparatuses and programs described herein may be embodied in a variety of other forms; furthermore, various omissions, substitutions and changes in the form of the apparatuses and programs described herein may be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a selector configured to
      acquire a first converted time obtained by converting a measurement time of a first piece of measurement data on the basis of a clock of a first time server, a second converted time obtained by converting the measurement time of the first piece of measurement data on the basis of a clock of a second time server, a third converted time obtained by converting a measurement time of a second piece of measurement data on the basis of the clock of the first time server, and a fourth converted time obtained by converting the measurement time of the second piece of measurement data on the basis of the clock of the second time server,
      determine whether an error occurs on the basis of the first, second, third, and fourth converted times,
      calculate the number of combinations of the first, second, third, and fourth converted times in which it is determined that no error occurs among two or more pieces of measurement data and two or more time servers, and
      select a time server with the largest number of combinations.

2. The apparatus according to claim 1, wherein the selector calculates a first difference between two converted times among the first, second, third, and fourth converted times, calculates a second difference between two converted times other than the converted times used to calculate the first difference among the first, second, third, and fourth converted times, calculates a third difference using the first difference and the second difference, calculates the third difference among two or more pieces of measurement data and two or more time servers, and determines that no error occurs when it is determined that the third difference is less than a threshold value.

3. The apparatus according to claim 1, wherein the selector selects the time server except for the first time server included in the combination which is determined to have an error.

4. The apparatus according to claim 1, further comprising:
a measurement unit configured to measure a physical amount and output measurement data; and
a transmitting unit configured to transmit the measurement data output from the measurement unit and a plurality of converted times obtained by converting a time when the measurement data is measured by using the clocks of the plurality of time servers.

5. The apparatus according to claim 1, further comprising:
an analyzing unit configured to analyze one or more pieces of measurement data and a converted time obtained by converting the measurement time of the measurement data on the basis of the clock of the first time server selected by the selector and generate an instruction code on the basis of the analysis result; and
a transmitting unit configured to transmit the instruction code generated by the analyzing unit to a receiving apparatus.

6. The apparatus according to claim 1, further comprising:
a measurement unit configured to measure a physical amount and output measurement data; and
a transmitting unit configured to transmit the measurement data output from the measurement unit and a time when the measurement data is measured.

7. A computer program product comprising a non-transitory computer-readable storage medium containing a program executed by a computer, the program causing the computer to execute:
acquiring a first converted time obtained by converting a measurement time of a first piece of measurement data on the basis of a clock of a first time server, a second converted time obtained by converting the measurement time of the first piece of measurement data on the basis of a clock of a second time server, a third converted time obtained by converting a measurement time of a second piece of measurement data on the basis of the clock of the first time server, and a fourth converted time obtained by converting the measurement time of the second piece of measurement data on the basis of the clock of the second time server;
determining whether an error occurs on the basis of the first, second, third, and fourth converted times;
calculating the number of combinations of the first, second, third, and fourth converted times in which it is determined that no error occurs among two or more pieces of measurement data and two or more time servers; and
selecting a time server with the largest number of combinations.

8. The product according to claim 7, wherein
the determining includes
calculating a first difference between two converted times among the first, second, third, and fourth converted times;
calculating a second difference between two converted times other than the converted times used to calculate the first difference among the first, second, third, and fourth converted times;
calculating a third difference using the first difference and the second difference;
calculating the third difference for two or more pieces of measurement data and two or more time servers; and
determining that no error occurs when it is determined that the third difference is less than a threshold value.

9. The product according to claim 7, wherein the selecting includes selecting the time server except for the first time server included in the combination which is determined to have an error.

* * * * *